United States Patent
Woronka

(10) Patent No.: US 10,911,563 B2
(45) Date of Patent: Feb. 2, 2021

(54) NETWORK SYSTEM, CLOUD CONNECTOR AND METHOD FOR IDENTIFICATION OF NETWORK DEVICES

(71) Applicant: SIEMENS AKTIENGESELLSCHAFT, Munich (DE)

(72) Inventor: Stefan Woronka, Baddeckenstedt (DE)

(73) Assignee: Siemens Aktietigesellschaft, Munich (DE)

( * ) Notice: Subject to any disclaimer, the term of this patent is extended or adjusted under 35 U.S.C. 154(b) by 174 days.

(21) Appl. No.: 15/641,971

(22) Filed: Jul. 5, 2017

(65) Prior Publication Data
US 2018/0013854 A1 Jan. 11, 2018

(30) Foreign Application Priority Data

Jul. 6, 2016 (EP) .................................... 16178191
Jun. 2, 2017 (EP) .................................... 17174234

(51) Int. Cl.
*H04L 29/08* (2006.01)
*G06F 9/445* (2018.01)
(Continued)

(52) U.S. Cl.
CPC .......... *H04L 67/303* (2013.01); *G06F 9/4451* (2013.01); *H04L 41/12* (2013.01);
(Continued)

(58) Field of Classification Search
CPC ... G06F 9/4451; H04L 41/12; H04L 61/2038; H04L 67/10; H04L 67/12; H04L 67/16; H04L 67/24; H04L 67/303
See application file for complete search history.

(56) References Cited

U.S. PATENT DOCUMENTS 10,044,675 B1 * 8/2018 Ettema ................ G06F 9/45533
2014/0336785 A1 * 11/2014 Asenjo ............... G05B 19/4185
700/17
(Continued)

FOREIGN PATENT DOCUMENTS

CN 204143522 U 2/2015
CN 204926139 U 12/2015
(Continued)

OTHER PUBLICATIONS

Storey et al: "Network discovery and its security applications", Network Security, Elsevier Advanced Technology, Amsterdam, NL, Bd. 2007, Nr. 3; pp. 15-18, XP022022190; ISSN: 1353-4858, DOI: 10.1016/S1353-4858(07)70028-4; 2007.
(Continued)

*Primary Examiner* — Joe Chacko
(74) *Attorney, Agent, or Firm* — Henry M. Feiereisen LLC

(57) ABSTRACT

A network system includes a first network user having a plurality of network devices, wherein the network devices have identification parameters for identification, a second network user having a cloud computing infrastructure, and a cloud connector having a first interface and a second interface. The cloud connector is connected via the first interface to the first network user and connected via the second interface to the second network user. The cloud connector executes a passive scan and an active scan of the first network user so that at least one of the network devices is identifiable by the cloud connector. A network device profile is loadable from the second network user into the cloud connector, and the active scan is executed on the basis of the network device profile being loaded into the cloud connector.

30 Claims, 1 Drawing Sheet

(51) Int. Cl.
 *H04L 12/24* (2006.01)
 *H04L 29/12* (2006.01)
(52) U.S. Cl.
 CPC .............. *H04L 67/10* (2013.01); *H04L 67/12* (2013.01); *H04L 67/16* (2013.01); *H04L 67/24* (2013.01); *H04L 61/2038* (2013.01)

(56) References Cited

U.S. PATENT DOCUMENTS

| | | | | |
|---|---|---|---|---|
| 2015/0078200 | A1* | 3/2015 | Kalkunte | ................ H04L 45/72 370/254 |
| 2015/0319006 | A1* | 11/2015 | Plummer | ............ H04L 12/2827 700/83 |
| 2015/0372865 | A1* | 12/2015 | Schmirler | ............. H04L 9/3263 709/221 |
| 2016/0173493 | A1 | 6/2016 | Wane | |
| 2016/0226732 | A1* | 8/2016 | Kim | .................... H04L 12/2807 |
| 2017/0064042 | A1* | 3/2017 | Vora | ........................ H04W 4/70 |
| 2017/0138180 | A1* | 5/2017 | Weatherhead | .......... E21B 47/12 |
| 2017/0187835 | A1* | 6/2017 | Lim | ........................ H04L 67/16 |

FOREIGN PATENT DOCUMENTS

| | | |
|---|---|---|
| DE | 102010063164 A1 | 6/2012 |
| DE | 102013018596 A1 | 5/2015 |

OTHER PUBLICATIONS

Bellagente Paolo et al: "Enabling PROFINET devices to work in IoT: Characterization and requirements"; 2016 IEEE International Instrumentation and Measurement Technology Conference Proceedings, IEEE, pp. 1-6, XP032928172, DOI: 10.1109/I2MTC.2016. 7520417; 2016.

* cited by examiner

NETWORK SYSTEM, CLOUD CONNECTOR AND METHOD FOR IDENTIFICATION OF NETWORK DEVICES

CROSS-REFERENCES TO RELATED APPLICATIONS

This application claims the priority of European Patent Application, Serial No. 16178191.9, filed Jul. 6, 2016, pursuant to 35 U.S.C. 119(a)-(d), the disclosure of which is incorporated herein by reference in its entirety as if fully set forth herein.

BACKGROUND OF THE INVENTION

The present invention relates to a network system, cloud connector, and to a method for identification of network devices.

The following discussion of related art is provided to assist the reader in understanding the advantages of the invention, and is not to be construed as an admission that this related art is prior art to this invention.

Field devices, which serve to acquire and/or influence process variables, are used frequently in automation systems. Measurement devices, such as for example fill level measurement devices, throughflow measurement devices, pressure and temperature measurement devices, pH measurement devices, conductivity measurement devices etc., which acquire the corresponding process variables fill level, throughflow, pressure, temperature, pH value or conductivity, are used for acquisition of process variables. Actuators, such as valves or pumps, via which for example the flow of a liquid through a pipeline or the fill level of a medium in a container is changed, are used to influence the process variables. All types of measurement devices and actuators are to be subsumed under the term 'field device' to be used in conjunction with the invention. In addition, in conjunction with the invention, all devices that are employed close to the process and that deliver and process process-relevant information, are also referred to as field devices. As well as the aforementioned measurement devices/sensors and actuators, such units as are directly connected to a field bus and which are used for communication with the higher-ranking unit are referred to as field devices in general, such as e.g. remote I/Os, gateways, linking devices and wireless adapters, PLCs etc. Usually, depending on the size of the system, a number of controllers PLC A, PLC B are arranged at the field level. The communication between the controllers PLC A, PLC B and the field devices A, S close to the process, already defined in greater detail, which are coupled to one of the controllers PLC A, PLC B, is undertaken via at least one field bus widely used in automation technology. At the controller level, the controllers PLC A, PLC B deliver their data and/or further processed measured values collected from the field devices A, S to a higher-ranking control unit, e.g. a SCADA. The field devices are designed with network capabilities and are connected to one another via a network. Each field device is assigned a unique address in the network. In this case, communication is undertaken via a defined network protocol.

When automation systems or automation cells are connected to a cloud-based infrastructure, the devices to be connected to the infrastructure must first be identified, then the available device parameters must be recognized and categorized and these must subsequently be forwarded to the cloud and the local cloud connector.

A connector plays a role wherever a link or an interface is needed. The cloud connector serves here as a link element between a cloud-based application and the automation system. In this case, the cloud connector can be embodied as an agent in a network, e.g. as reverse invoke proxy. While a typical proxy can be used to grant access to an external network to a number of clients of an internal network, a reverse proxy functions precisely the other way round.

After the cloud connector has been incorporated into an automation system or automation cell, the devices to be connected have previously had to be added-in manually. This means that the necessary features for a device must first be established and must then be entered. This establishing is currently performed manually and must then be entered manually into the cloud connector. If necessary, the data inputs must then be repeated centrally (in the cloud) once again.

It would therefore be desirable and advantageous to address these prior art problems and to obviate other prior art shortcomings.

SUMMARY OF THE INVENTION

According to one aspect of the present invention, a network system includes a first network user including a plurality of network devices having identification parameters for identification, a second network user including a cloud computing infrastructure and a network profile, and a cloud connector having a first interface via which the cloud connector is connected to the first network user, and a second interface via which the cloud connector is connected to the second network user, the cloud connector being configured to carry out a passive scan and an active scan of the first network user so that at least one of the network devices is identifiable by the cloud connector, the network device profile being loadable from the second network user into the cloud connector, with the active scan being executed on the basis of the network device profile being loaded into the cloud connector.

According to another aspect of the present invention, a cloud connector for a network system includes a first interface configured for connecting the cloud connector to a first network user having a plurality of network devices having identification parameters for identification, and a second interface configured for connecting the cloud connector to a second network user having a cloud computing infrastructure and a network profile, with the network device profile being loadable from the second network user into the cloud connector, the cloud connector being configured to carry out a passive scan and an active scan of the first network user, so that at least one of the network devices is identifiable by the cloud connector, with the active scan being executed on the basis of the network device profile being loaded into the cloud connector.

According to still another aspect of the present invention, a method for operating a network system having first and second network users, with the first network use including a plurality of network devices, includes connecting a first interface of a cloud connector to the first network user and connecting a second interface of the cloud connector to the second network user, passively scanning the first network user by the cloud connector, loading a network device profile from the second network user into the cloud connector, actively scanning the first network user by the cloud connector on the basis of the network device profile loaded user into the cloud connector, and identifying at least one network device of the first network user by the cloud connector.

The second network user with cloud computing infrastructure is understood below as a cloud and is also described as such below. Cloud computing includes technologies and business models for making IT resources, applications and services available dynamically. A definition of a "cloud" is given by the National Institute of Standards and Technology (NIST) for example.

It is known that the features necessary and needed for a network device must first be established and then entered into the cloud connector, i.e. that all devices to be connected must be acquired and entered manually.

It has been recognized that this manual establishment is frequently prone to errors and is then associated with significant clarification effort for implementation both locally and also centrally. This is now avoided by the present invention.

The advantages of the present invention lie in a number of dimensions. The susceptibility to errors is reduced in that the devices are identified electronically and the services provided can then be loaded directly. The profiles or identification parameters for similar devices are held centrally and in this way can be created and managed centrally for new device classes. Furthermore, the costs of recognition are reduced. In addition, a large number of devices can be recognized in a short time.

The effect of the invention is a central and rapid recognition of the components connected to the cloud solution as well as a marked reduction in the expense of making local connections.

Advantageously, the network device profiles of a number of network devices up to all of the network devices that are available or recognized by the passive scan are loaded from the second network user into the cloud connector.

Advantageously, the respective network device profile includes information that characterizes the respective network device. In particular, the respective network device profile includes at least one of the following items of information of the respective network device: Device manufacturer, device type, device version, device generation, version of the software or firmware installed on the network device, field of application of the network device or similar characteristics. For example, the network device profile can thus feature the information "Siemens programmable logic controllers (PLC) Simatic S7-1500 Version 1, application in Food & Beverage". In addition or as an alternative, the respective network device profile can comprise at least one identification parameter of the respective network device.

Further advantageous measures, which can be combined with each other in any given manner in order to achieve further advantages, are listed in the dependent claims.

According to another advantageous feature of the present invention, at least individual network device profiles, i.e. the identification parameters of the identified network devices, can be created by the cloud connector and assigned to the individual network devices.

According to another advantageous feature of the present invention, at least individual network device profiles can be loaded from the second network user into the cloud connector. As an alternative or in addition, at least individual network device profiles can be stored beforehand in the cloud connector.

Thus, the cloud connector can then load corresponding profiles (depending on the device recognized), i.e. the identification parameters, from the cloud or has already obtained them beforehand, in order to carry out a more precise profiling of the identified devices without any repercussions.

According to another advantageous feature of the present invention, the identification parameters can be stored in the cloud connector.

According to another advantageous feature of the present invention, the cloud connector can receive transmissions during the passive scan that are initiated by the number of network devices. Thus, the cloud connector carries out a passive scan of the first network user. During an active scan of the cloud connectors, the network devices are actively addressed. The scan is executed in order to roughly recognize the present network devices so as to ensure that the activity of the recognized network devices is not adversely affected.

According to another advantageous feature of the present invention, each of the network devices can have a unique address in the first network user and can include other network-device-related data as its identification parameters. Other identification parameters can be, for example, device type and/or hardware status and/or software status and/or firmware status and/or the service provided.

According to another advantageous feature of the present invention, the cloud connector can be incorporated into the first network user. The first network user in this case can be embodied in particular as an automation system with an automation network.

According to another advantageous feature of the present invention, identification information of the cloud connector and identification information of the second network user are held in the cloud connector. In particular, in this regard, an ID (standing for user identifier, unit identifier or unique identifier) of the cloud connector, for example its MAC (media access control) address, and an ID of the second network user, for example the MAC address or for example the IP address, are held or stored in a memory area of the cloud connector. The cloud connector is already pre-configured for a connection to a cloud. The provider of such a cloud can thus provide cloud connectors that are preconfigured for their cloud computing infrastructure and reduce or simplify the installation effort for field devices on the cloud.

According to another advantageous feature of the present invention, the cloud connector executes a connection of the first network user to the second network user, i.e. it is used for simplified connection, for example, of the automation system with the automation network to the cloud.

In this case, the cloud connector can be used in particular in the network system or in the method in accordance with the present invention. Likewise, the method according to the present invention can be executed on the network system according to the present invention.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
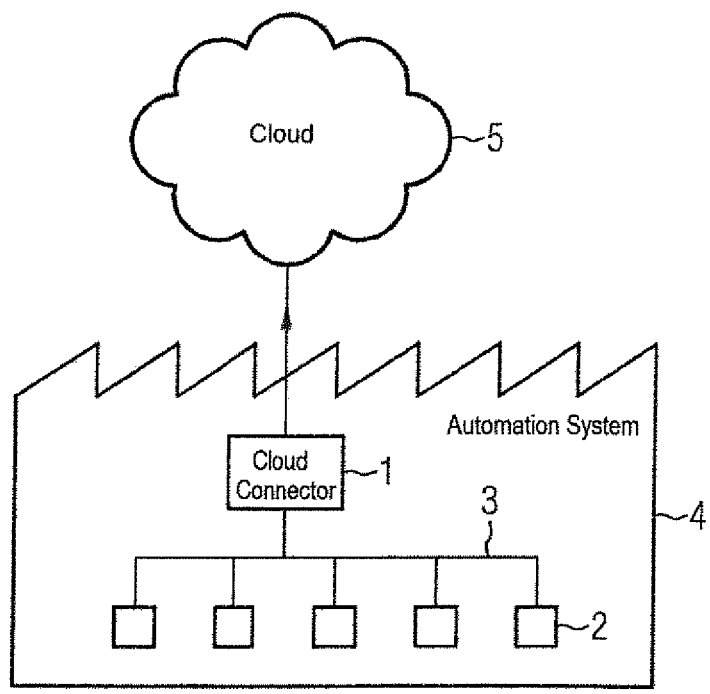
FIG. 1 is a schematic illustration of an exemplary network system according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic illustration of an exemplary network system according to the present invention. FIG. 1 shows a cloud connector 1. To link the automation system 4 to a cloud 5, this is connected in an automation network 3 of the automation system 4. In this case, the cloud connector 1 can also be installed directly in the automation network 3, as a software agent, for example. The automation network 3 has network devices 2. When the cloud connector 1 is taken into an automation system 4, it obtains the necessary information to look around it in the network. This is e.g. an own IP address, a connection into the cloud (routing) etc.

The cloud connector 1 then carries out a scan of the automation network 3 with the network devices 2. For this purpose, a first passive scan is initially executed and then an explicit active scan is carried out in order to be able to roughly recognize the network devices 2 present. The scans are performed so that the detected network devices 2 are not influenced in their activity. In this case a passive scan is almost to be understood as "listening in" on the automation network 3. Here the initiative is taken by the network devices 2, i.e. no direct interaction with the network devices 2 takes place. An active scan describes the active response of network devices 2. In this case an active return flow of identification parameters takes place for identification of the network devices 2. Thus, the passive scan is first executed and then the active scan is carried out.

Figure 2:
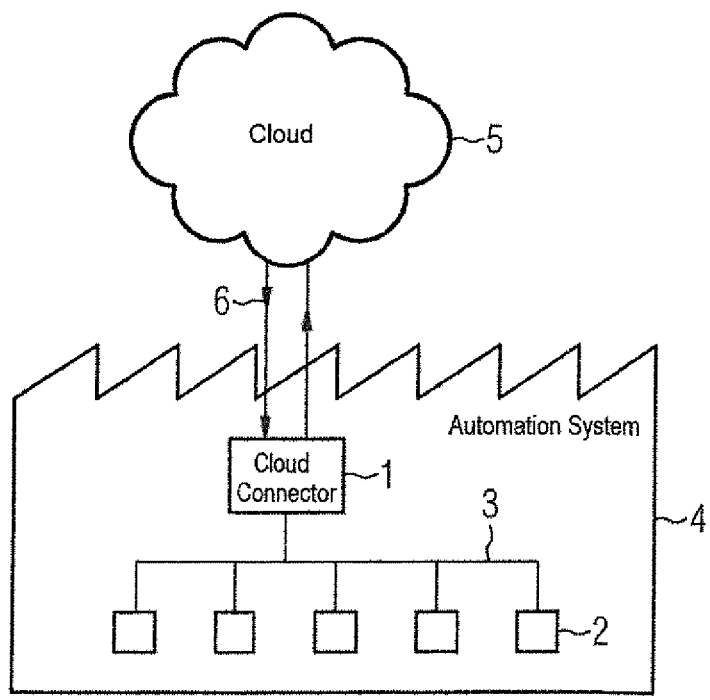
FIG. 2 is a schematic illustration of an exemplary embodiment of a network system according to the present invention.

FIG. 2 shows that the cloud connector 1 then loads from the cloud 5 (arrow 6) corresponding network device profiles, for example identification parameters and/or information characterizing the respective network device, such as device type, installed software version etc., depending on the network device 2. As an alternative or in addition, the cloud connector 1 has already obtained said information beforehand, i.e. when it is incorporated into the automation network 3. This is now assigned. Thus a more precise profile without any repercussions (i.e. assign all necessary identification parameters to the network devices 2) of the identified network devices 2 can be carried out.

The frequency of errors is reduced by an electronic identification of the network devices 2. Also cost savings can be made for example if the services provided can be loaded directly. The profiles for similar network devices 2 are held separately and in this way can be created and managed centrally for new device classes.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A network system, comprising
an automation system representing a first network user and including a plurality of field devices having identification parameters for identification of the field devices, with the field devices serving to acquire or influence process variables;
a second network user including a cloud computing infrastructure and a field device profile; and
a cloud connector being incorporated into the first network user and having a first interface connected to the automation system, and a second interface connected to the second network user, said cloud connector being configured to first carry out a passive scan, wherein during the passive scan the cloud connector receives a transmission which is initiated by at least one of the field devices and identifies the at least one field device and loads a field device profile from the second network user into the cloud connector, and to thereafter carry out an active scan of the automation system, wherein during the active scan the cloud connector actively addresses the field devices and wherein the active scan is executed on the basis of the field device profile being loaded into the cloud connector.

2. The network system of claim 1, wherein the identification parameters of the field devices that have been identified are creatable by the cloud connector and assigned to the individual field devices.

3. The network system of claim 1, wherein identification parameters are loadable from the second network user into the cloud connector.

4. The network system of claim 3, wherein individual ones of the identification parameters from the second network user are loadable beforehand into the cloud connector.

5. The network system of claim 2, wherein individual ones of the identification parameters from the first network user are stored beforehand in the cloud connector.

6. The network system of claim 1, wherein the cloud connector stores the identification parameters.

7. The network system of claim 1, wherein each of the field devices has a unique address in the automation system and includes other field-device-related data.

8. The network system of claim 7, wherein the other field-device-related data comprises at least one member selected from the group consisting of device type, hardware status, software status, firmware status, and service provided.

9. The network system of claim 1, wherein the cloud connector is incorporated into the automation system.

10. The network system of claim 1, wherein the automation system is part of an automation network.

11. The network system of claim 1, wherein a plurality of field device profiles or all field device profiles are loadable from the second network user into the cloud connector.

12. The network system of claim 1, wherein the identification parameters are initially created by the cloud connector and assigned to the individual field devices, and are subsequently downloaded from the cloud computing infrastructure to carry out a more precise profiling of the identified field devices.

13. The network system of claim 1, wherein the field device profile comprises at least one of the following information of a respective field device: device manufacturer, device type, device version, device generation, software version, installed on the field device, hardware version, installed on the field device, and field of application of the respective field device.

14. The network system of claim 1, wherein the field devices are directly connected to a field bus and are in communication with a higher-ranking unit.

15. The network system of claim 1, wherein the field devices are measurement devices or actuators, wherein the measurement devices comprise devices selected from the group of fill level measurement devices, throughflow measurement devices, pressure and temperature measurement devices, pH measurement devices, and conductivity measurement devices, and the measurement devices acquire corresponding process variables selected from the group of fill level, throughflow, pressure, temperature, pH value and conductivity, and wherein the actuators comprise valves or pumps and the process variables control a throughflow of a liquid through a pipeline or the fill level of a medium in a container.

16. A cloud connector for a network system, comprising:
- a first interface configured for connecting the cloud connector to an automation system representing a first network user and including a plurality of field devices having identification parameters for identification, with the field devices serving to acquire or influence process variables; and
- a second interface configured for connecting the cloud connector to a second network user having a cloud computing infrastructure and a field device profile, with the field device profile being loadable from the second network user into the cloud connector,
- said cloud connector being configured to first carry out a passive scan, wherein during the passive scan the cloud connector receives a transmission which is initiated by at least one of the field devices and identifies the at least one field device without interfering with an activity of the at least one field device and loads a field device profile from the second network user into the cloud connector, and to thereafter carry out an active scan of the automation system, wherein during the active scan the cloud connector actively addresses the field devices, and wherein the active scan is executed on the basis of the field device profile being loaded into the cloud connector.

17. The cloud connector of claim 16, configured to store identification information of the cloud connector and identification information of the second network user.

18. The cloud connector of claim 16, wherein the field devices are directly connected to a field bus and are in communication with a higher-ranking unit.

19. The cloud connector of claim 16, wherein the field devices are measurement devices or actuators, wherein the measurement devices comprise devices selected from the group of fill level measurement devices, throughflow measurement devices, pressure and temperature measurement devices, pH measurement devices, and conductivity measurement devices, and the measurement devices acquire corresponding process variables selected from the group of fill level, throughflow, pressure, temperature, pH value and conductivity, and wherein the actuators comprise valves or pumps and the process variables control a throughflow of a liquid through a pipeline or the fill level of a medium in a container.

20. A cloud connector for a network system, said network system comprising an automation system representing a first network user and including a plurality of field devices which have identification parameters for identification, with the field devices serving to acquire or influence process variables, a second network user including a cloud computing infrastructure and a field device profile; and a first interface connected to the automation system, and a second interface connected to the second network user, said cloud connector being configured to first carry out a passive scan, wherein during the passive scan the cloud connector receives a transmission which is initiated by at least one of the field devices and identifies the at least one field device and loads a field device profile from the second network user into the cloud connector, and to thereafter carry out an active scan of the automation system, wherein during the active scan the cloud connector actively addresses the field devices and wherein the active scan is executed on the basis of the field device profile being loaded into the cloud connector.

21. A method for operating a network system having first and second network users, with the first network user including a plurality of field devices serving to acquire or influence process variables and the second network user including a cloud computing infrastructure and a field device profile, said method comprising:
- connecting a first interface of a cloud connector to the first network user and connecting a second interface of the cloud connector to the second network user;
- passively scanning the first network user by the cloud connector,
- receiving during passive scanning at the cloud connector a transmission which is initiated by at least one of the field devices, identifying the at least one field device, and loading a field device profile from the second network user into the cloud connector;
- thereafter actively scanning the automation system by addressing with the cloud connector the field devices and executing the active scan on the basis of the field device profile loaded into the cloud connector.

22. The method of claim 21, further comprising creating identification parameters of the network devices that have been identified by the cloud connector and assigning the identification parameters to the individual network devices.

23. The method of claim 21, further comprising loading individual identification parameters from the second network user into the cloud connector.

24. The method of claim 22, further comprising storing individual identification parameters of the network devices beforehand in the cloud connector.

25. The method of claim 23, further comprising storing individual identification parameters from the second network user beforehand in the cloud connector.

26. The method of claim 21, further comprising establishing a link by the cloud connector between the first network user and the second network user.

27. The method of claim 21, further comprising incorporating the cloud connector into the first network user.

28. The method of claim 21, wherein a plurality of field device profiles or all field device profiles are loaded from the second network user into the cloud connector.

29. The method of claim 21, wherein the field devices are directly connected to a field bus and are in communication with a higher-ranking unit.

30. The method of claim 21, wherein the field devices are measurement devices or actuators, wherein the measurement devices comprise devices selected from the group of fill level measurement devices, throughflow measurement devices, pressure and temperature measurement devices, pH measurement devices, and conductivity measurement devices, and the measurement devices acquire corresponding process variables selected from the group of fill level, throughflow, pressure, temperature, pH value and conductivity, and wherein the actuators comprise valves or pumps and the process variables control a throughflow of a liquid through a pipeline or the fill level of a medium in a container.

* * * * *